May 18, 1965  G. MEWS  3,183,752
MULTIPLE ROLL TAPE DISPENSER WITH RECEPTACLE
Filed May 21, 1963  7 Sheets-Sheet 2

Fig. 2

INVENTOR
GÜNTER MEWS
BY Michael J. Striker
his ATTORNEY

May 18, 1965 G. MEWS 3,183,752
MULTIPLE ROLL TAPE DISPENSER WITH RECEPTACLE
Filed May 21, 1963 7 Sheets-Sheet 6

INVENTOR
GÜNTER MEWS
BY Michael J. Striker
his ATTORNEY

May 18, 1965            G. MEWS            3,183,752

MULTIPLE ROLL TAPE DISPENSER WITH RECEPTACLE

Filed May 21, 1963            7 Sheets-Sheet 7

INVENTOR
GÜNTER MEWS
BY
Michael J. Striker
his ATTORNEY

United States Patent Office 3,183,752
Patented May 18, 1965

3,183,752
MULTIPLE ROLL TAPE DISPENSER WITH RECEPTACLE
Günter Mews, Bad Godesberg, Germany
Filed May 21, 1963, Ser. No. 281,997
Claims priority, application Germany, May 24, 1962,
M 41,468; June 12, 1962, M 41,610
11 Claims. (Cl. 83—167)

The present invention relates to dispensers in general, and more particularly to a dispenser which may be utilized for dispensing predetermined lengths of convoluted tape at the discretion of an operator. Still more particularly, the invention relates to a dispenser which is especially suited for selectively discharging predetermined numbers of coupons which together form a roll of convoluted tape and which are separated from each other by transversely extending rows of perforations. Such coupons are being distributed by supermarkets and by other types of commercial establishments, by ticket agencies, by cashiers in sports arenas, theaters or circuses and in many other institutions where coupons are being used as tickets against payment of admission fee or as receipts for purchase of cut-rate bonus articles or for exchange against gifts. Furthermore, the dispensers may be utilized for discharging coiled postage stamps.

It is an important object of the invention to provide a very simple, compact, low-cost and easy-to-handle dispenser which may be utilized for controlled discharge of predetermined lengths of convoluted tape each of which may comprise one or more interconnected coupons, and which may be utilized for controlled discharge of two or more different types of coupons.

Another object of the invention is to provide a very simple actuating and transfer mechanism which is capable of expelling from the housing of the dispenser predetermined lengths of tape in such a way that each length of tape always equals a whole-number multiple of a unit length.

A further object of the invention is to provide an improved cutting device for a dispenser of the above outlined characteristics.

An additional object of the invention is to provide a cutting device which may simultaneously serve as a collecting receptacle for severed lengths of one or more tapes.

Still another object of the invention is to provide a dispenser which is constructed and assembled in such a way that it may be readily and rapidly taken apart when the supply of tape is exhausted, which may be manipulated by one hand so that the other hand of the operator may remain free to receive payment and to return change, and which enables an operator to readjust the actuating mechanism in the event of improper selection of such length of tap which is to be expelled from the dispenser.

Another object of the invention is to provide a dispenser for dispensing predetermined lengths of one, two or more convolution tapes which is provided with a cutting device and wherein the cutting device is constructed and mounted in such a way that each tape is automatically severed as soon as the desired length of tape is expelled from the housing of the dispenser.

With the above objects in view, one feature of the invention resides in the provision of a dispenser which comprises a housing defining an internal chamber arranged to accommodate one or more convoluted tapes and having a discharge opening through which the tape may be expelled, a transfer roller provided in the housing for each tape and having a tape-engaging peripheral portion, and actuating means for rotating the roller or rollers unidirectionally through selected angles so that the peripheral portion of a given roller expels a predetermined length of tape through the discharge opening. Each actuating means comprises a lever having an inner end portion which is rotatably mounted in the chamber and a manually operable outer end portion which extends from the housing. The lever is pivotable between a starting position and a series of operative positions each of which corresponds to a selection of a given length of the respective tape (or to a given number of interconnected coupons) which is to be expelled through the discharge opening. Each actuating means further comprises clutch means including clutch elements providing on the respective roller and on the associated lever, and the clutch elements cooperate with each other to rotate the roller when the respective lever is pivoted from one of its operative positions back to its starting position.

The novel features which are considered as characteristic of the invention are set forth in particular in the appended claims. The improved dispenser itself, however, both as to its construction and the method of assembling and operating the same, together with additional features and advantages thereof, will be best understood from the following detailed description of certain specific embodiments with reference to the accompanying drawings, in which:

Figure 1:
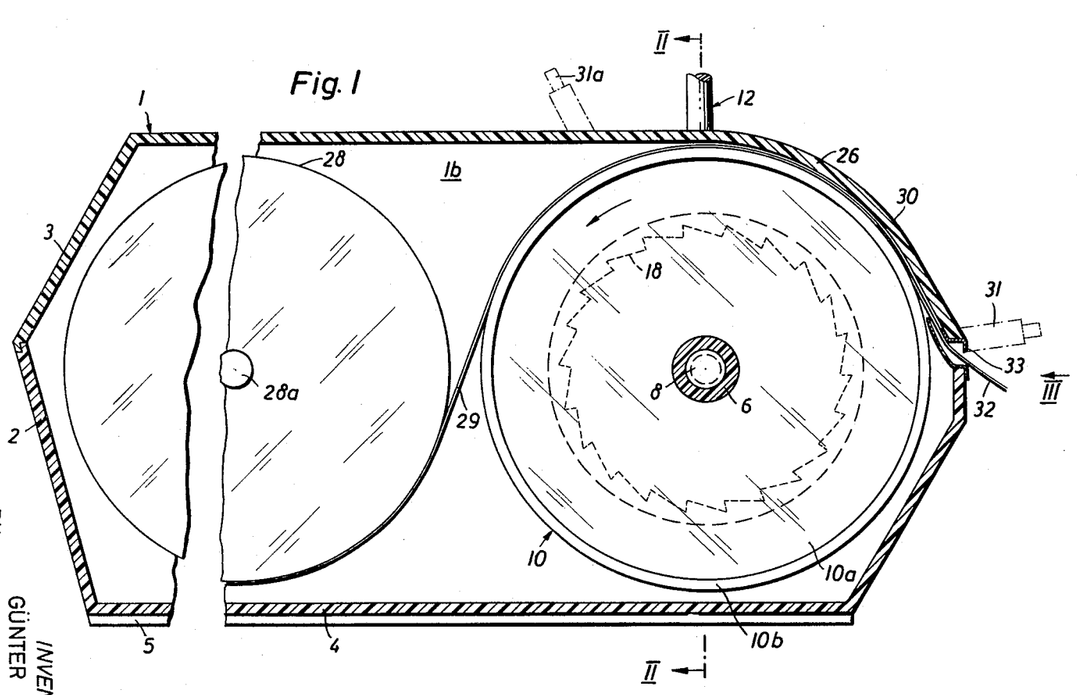
FIG. 1 is a longitudinal vertical section through a dispenser which embodies one form of my invention, the section being taken in the direction of arrows as seen from the line I—I of FIG. 2.
Figure 2:
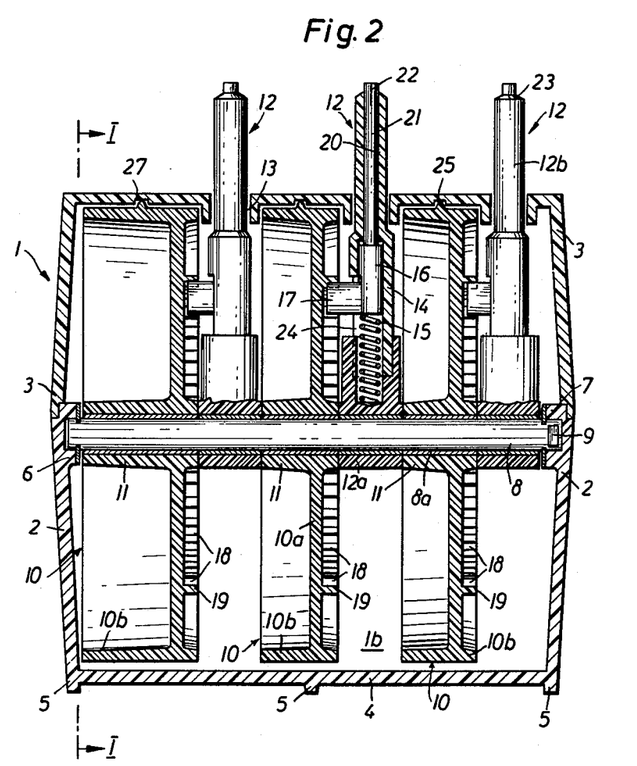
FIG. 2 is a transverse vertical section as seen in the direction of arrows from the line II—II of FIG. 1.
Figure 3:
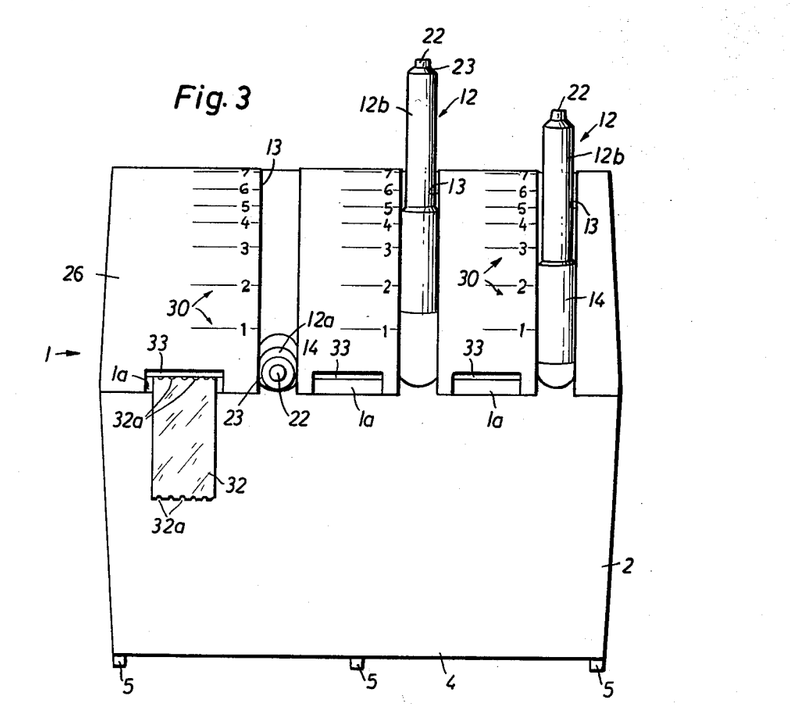
FIG. 3 is a front elevational view of the dispenser as seen in the direction of arrow III from the righthand side of FIG. 1.

Referring first to FIGS. 1 to 3, there is shown a dispenser which comprises a substantially box-shaped two-piece housing 1 having a cupped upper portion or cover 3 and a substantially rectangular lower portion or base 2. The bottom wall 4 of the base 2 is provided at its underside with reinforcing ribs 5, and this base further comprises a pair of aligned but spaced bearings 6, 7 for the ends of a horizontal shaft 8 which is mounted in the internal chamber 1b of the housing 1. At least one end portion (shown at 9) of this shaft is of non-circular shape and the respective bearing (7) has a non-circular bore so that the shaft is held against rotation with respect to the base 2. The bearings 6, 7 are provided close to the open upper end of the base, and the latter consists of elastically deformable synthetic plastic material which enables an operator to increase the distance between the bearings at the time the shaft 8 is being inserted into the housing. The base 2 thereupon snaps back and prevents accidental withdrawal of the shaft from its bearings. In the illustrated embodiment, the shaft 8 is telescoped into a wear-resistant bearing sleeve 8a.

As shown in FIG. 1, the shaft 8 is located in the front section of the internal chamber 1b and its purpose is to support one or more transfer or take-off rollers 10. In the embodiment of FIGS. 1 to 3, the shaft 8 supports three axially spaced rollers 10, and each of these rollers has a hub 11 which is frictionally fitted onto the bearing sleeve 8a so that the rollers are normally held against angular displacement with respect to the shaft 8. In other words, at least some force is necessary to change the angular positions of the rollers because the parts 6, 7, 8, 8a together constitute a braking means which tends to hold the rollers against rotation with respect to the housing.

Adjacent to one side of each roller 10, there is provided an actuating lever 12 which forms part of an actuating means serving to selectively rotate the respective roller in a clockwise direction, reference being had to FIG. 1. Each lever 12 comprises an annular inner end portion or eye 12a which is rotatable about the bearing sleeve 8a and a tubular outer end portion or handle 12b which extends outwardly through one of three elongated slots 13 provided in the cover 3, see particularly FIG. 3. Furthermore, each lever 12 includes a tubular central portion 14, hereinafter called cylinder, whose open end is press-fitted into the respective eye 12a. The cylinders 14 accommodate compressed helical springs 15 which may extend into aligned bores of the respective eyes 12a. Each of these springs serves as a means for biasing a plunger 16 provided in the respective cylinder 14 and rigid with a manually depressible releasing element or rod 21 whose outer end portion or tip 22 extends outwardly and beyond the outer end 23 of the respective handle 12b. Each plunger 16 carries a laterally extending clutch element or pawl 17 which projects through an axially parallel guide slit 24 of the respective cylinder and engages a selected tooth 18 of a second clutch element here shown as a ratchet wheel 19 provided in the interior of the respective roller 10. As shown in FIG. 2 each roller comprises a disk-shaped web 10a which is integral with the respective hub 11 and with a circumferential flange 10b which latter constitutes the tape-engaging portion of the roller and which extends axially beyond both sides of the web 10a. Each ratchet wheel 19 is integral with that side of the respective web 10a which faces the cooperating lever 12. Such arrangement results in a space-saving construction because the ratchet wheels 19 need not extend beyond the outlines of the respective flanges 10b. Furthermore, and in order to simplify the construction of the actuating mechanism, I prefer to utilize ratchet wheels which resemble internal gears, i.e., wherein the teeth 18 extend inwardly rather than outwardly as in conventional ratchet wheels.

The pawls 17 and the ratchet wheels 19 together constitute releasable one-way clutch means which enable the levers 12 to entrain the respective rollers 10 or to be pivoted about the shaft 8 without compelling the rollers to share their movements. In fact, the hubs 11 may be fitted onto the sleeve 8a with such force that the pawls 17 merely ride over the teeth 18 without causing any angular displacement of the rollers when the operator decides to pivot the levers in a counterclockwise direction as viewed in FIG. 1. In such dispensers, the releasing rods 21 may be dispensed with. However, it is normally advisable to provide the dispenser with such releasing rods because they enable an operator to correct the setting of the levers 12 if he or she has made a mistake at the time the levers were moved from their idle or starting positions.

The flanges 10b are provided with angularly spaced outwardly extending projections 25 which serve to enter the perforations of a convoluted tape 29 and which travel in arcuate grooves 27 provided in the curved front section 26 of the cover 3. The tapes 29 are stored on reels 28 which are rotatably supported by a second horizontal shaft 28a mounted in the rear portion of the housing 1 in such a way that it is parallel with the shaft 8. The grooves 27 and the projections 25 cooperate to hold the tapes 29 against slipping with respect to the peripheral flanges 10b of the respective rollers.

The levers 12 normally assume the idle or starting positions 31 one of which is shown in FIG. 1 and in the left-hand portion of FIG. 3. The exterior of the front cover section 26 is provided with suitable indicia 30 (such as numerals 1 to 10) which are adjacent to the slots 13 and which enable the operator to select the exact number of coupons 32 (i.e., a desired length of tape) which is to be dispensed from the housing 1. The front wall of the housing 1 is provided with three discharge openings 1a which are adjacent to rthe lower edge portion of the arcuate section 26 and whose upper sides are bounded by horizontal cutoff knifes 33. Each tape 29 consists of a single file of coupons 32 which are separated by transversely extending rows of perforations 32a, and the arrangement is preferably such that the distance between two adjacent rows of perforations 32a equals the angular distance between the projections 25 on the flanges 10b of the respective rollers.

The dispenser of FIGS. 1 to 3 operates as follows:

If the operator desires to remove say six coupons 32 from the tape 29 which is trained around a portion of the flange 10b of the left-hand roller 10, as viewed in FIG. 2, he moves the corresponding actuating lever 12 from the starting position 31 to the operative position 31a, see FIG. 1. Such movement of this lever is effected after the operator depresses the tip 22 of the respective releasing rod 21 so that the pawl 17 is disengaged from the teeth of the respective ratchet wheel 19. In other words, when a lever 12 is moved from the position 31 to the position 31a, the angular position of the respective roller 10 remains unchanged. In the next step, the operator releases the tip 22 and pivots the lever back to the starting position 31 whereby the projections 25 expel six coupons 32 through the respective opening 1a. When the dispenser operates properly, the cutting edge of the knife 33 is adjacent to a row of perforations 32a whenever a lever 12 assumes the starting position 31. Therefore, each knife will make a clean cut across the perforations when the operator grasps the strip of coupons 32 and pulls the strip upwardly to move the last visible row of perforations 32a against the cutting edge. The friction between the hubs 11 and the bearing sleeve 8a is sufficient to prevent rotation of the rollers 10 in response to a pull exerted on the strips of coupons at the time the strips are being severed by the edges of the cutoff knives 33.

It goes without saying that the improved dispenser may comprise only one, two, four or more rollers 10 and an equal number of actuating levers 12. If the dispenser comprises two or more levers, they may be returned to the starting positions 31 by a single movement of the partly or fully outstretched hand. Also, the axial length of all of the rollers need not be the same. FIG. 2 shows by way of example that the axial length of the leftmost flange 10b exceeds the axial length of the other two flanges. Such arrangement may be necessary when the width of a given tape 29 exceeds the width of the other tapes.

Two or more rollers are normally necessary when a store, a ticket selling agency or another establishment which sells or distributes tickets or coupons that are being severed from a convoluted tape must issue two or more different types of coupons to a single customer. For example, supermarkets often distribute green, red, white or otherwise colored coupons each of which has a different redeeming value. Such differently colored coupons may form a series of adjacent tapes which may be stored in the housing 1 upon detachment of the cover 3 from the base 2. The cover may be held on the base merely by friction or by means of simple locking devices, not shown, so that the dispenser may be reloaded with little loss in time. If desired, the cutoff knives 33 may be mounted on the base 2 or, alternatively, each opening 1a may be bounded by an upper knife and a lower knife.

The operation of the dispenser is even simpler if the frictional engagement between the hubs 11 and the bearing sleeve 8a is such that the pawls 17 will merely ride over the teeth 18 of the respective ratchet wheels 19 when the operator decides to move the levers 12 from their starting poistions 31. In such event, the operator depresses the releasing rods 21 only at the time he or she makes an error in the selection of a given number of coupons and is then in a position to adjust a given lever without being compelled to return the lever to its starting position prior to making a proper selection. Thus, it is assumed that the operator has desired to dispense a strip of six coupons 32 but the respective lever was accidentally moved to a position which would correspond to a selection of seven coupons. Instead of returning the lever to its starting position and thereby expelling seven coupons, the operator merely depresses the respective rod 21 to disengage the pawl 17, whereupon the lever may be adjusted to assume a new position in which it is adjacent to the respective numeral 6 on the front cover section 26.

Owing to the fact that the ratchet wheels 19 are provided within the outlines of the respective flanges 10b, the width of the dispenser is exceptionally small even if the dispenser accommodates a substantial number of transfer rollers. Therefore, two or more levers may be returned to starting positions 31 by a single movement of the operator's hand. All parts of the dispenser with the exception of springs 15 and eventually of the bearing sleeve 8a may be made of synthetic plastic material even though I also contemplate using metals and/or wood for making at least some of the component parts. Each actuating lever may be furnished in a different color so that the operator will immediately know which lever is to be actuated in order to dispense a certain type of coupons. When in starting positions 31, the levers 12 are preferably aligned with each other and their handles 12b are then located at a level just above the respective openings 1a, see FIG. 3.

It will be readily understood that the dispenser of my invention is equally useful for dispensing of predetermined lengths of tape each of which is a whole-number multiple of a unit length and wherein the unit lengths are not separated by perforations. In such instances, the knives 33 will sever selected lengths from the main supply of tape in response to a somewhat stronger pull upon such portions of tapes which are expelled through the discharge openings. If desired, the housing may be formed with a single discharge opening for two or more tapes and the knives 33 may be replaced by a single knife.

Figure 4:
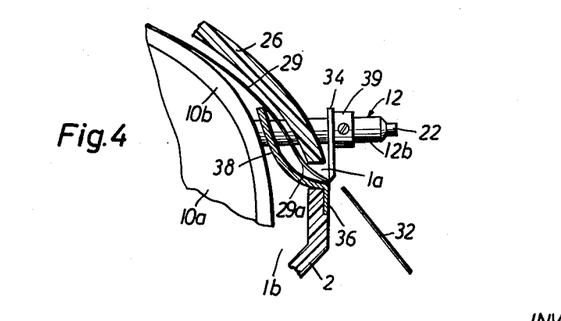
FIG. 4 is a fragmentary longitudinal vertical section through a modified dispenser wherein the actuating lever carries a knife so that a selected length of tape is severed in a fully automatic way when the lever returns to its starting position.

FIG. 4 illustrates a portion of a slightly modified dispenser which includes an automatic cutting device serving as a means for severing that length of tape which is expelled from the housing. The lever 12 carries a laterally extending knife 34 whose cutting edge is arranged to cooperate with the cutting edge of a fixed knife 36. The knife 36 is secured to the base 2 and is adjacent to the lower wall of the discharge opening 1a. When the lever 12 is pivoted to its starting position which is shown in FIG. 4, the cutting edge of the knife 34 severs with a shearing action one or more coupons 32 from the tape 29 by cooperating with the cutting edge of the fixed knife 36. The foremost end of the tape 29 is flexed (as at 29a) when the lever 12 completes the last portion of its movement toward the starting position, but there is sufficient room in the chamber 1b for such flexing of the tape. As soon as the lever moves away from the position of FIG. 4, the knife 34 exposes the opening 1a and the tape is free to return to its undeformed position whereby a very short length of the tape extends through the opening. It will be noted that the fixed knife 36 comprises an upwardly and inwardly extending guide portion 38 which serves to direct the tape toward and into the opening 1a. The knife 34 is provided with a sleeve 39 which is nonrotatably secured to the handle 12b, and this knife is located externally of and at a level above the opening 1a. Thus, if the leftmost lever 12 of FIG. 3 were provided with such a knife, the latter would be located above the leftmost discharge opening 1a.

An important advantage of the knife 34 is that a selected length of tape including one, two or more coupons 32 is severed in a fully automatic way as soon as the respective lever returns to its starting position. If desired, the lever may be mounted in such a way that it depresses a knife mounted on the cover section 26 at the time it approaches its starting position so that such knife will sever one or more coupons even though it is not connected with the lever. This modification is so obvious that it will be readily comprehended without necessitating a separate illustration. All that counts is to provide a fixed knife and a movable knife which latter is caused to cooperate with the fixed knife at the time the lever approaches or assumes its starting position in order to automatically sever that portion of the tape which extends through the discharge opening.

Figure 5:
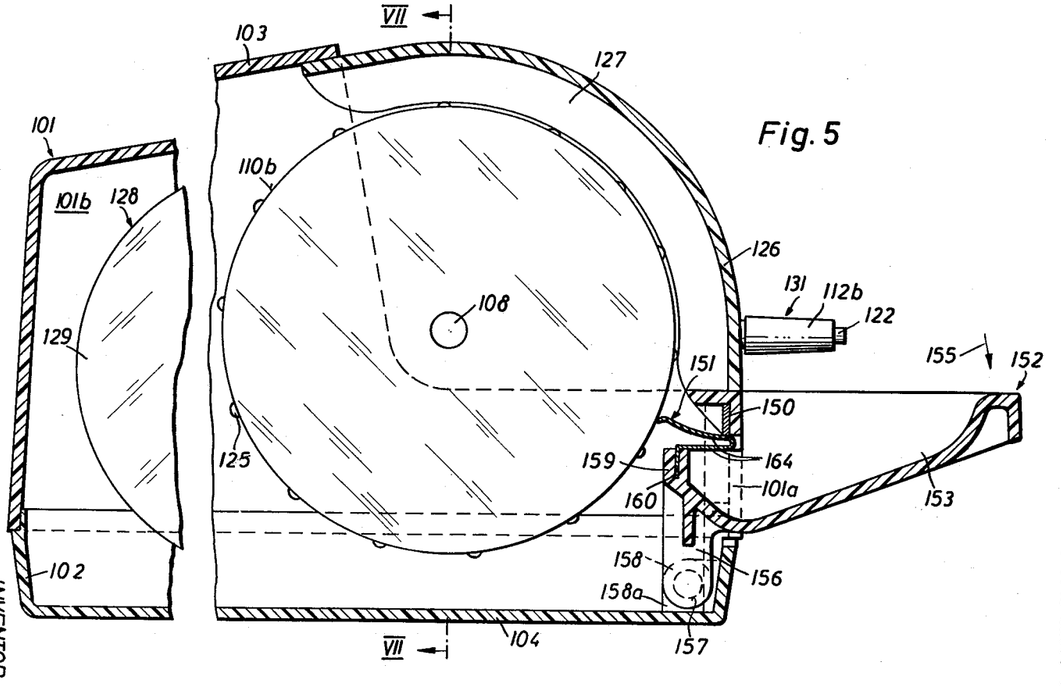
FIG. 5 is a fragmentary longitudinal vertical section through a further dispenser which is provided with a specially constructed cutting device for two tapes and wherein the cutting device comprises a receptacle adapted to collect the coupons which are severed from the tapes.
Figure 7:
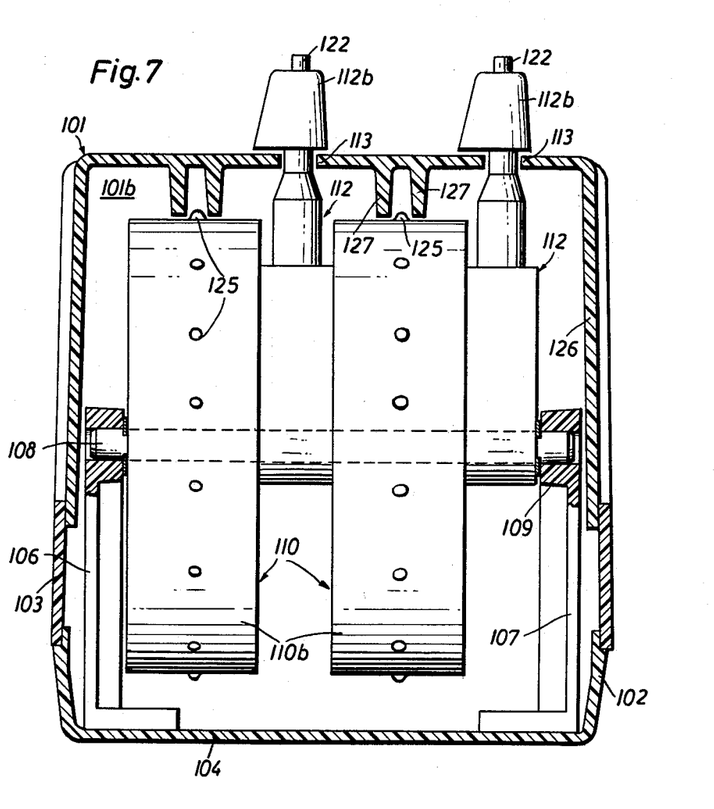
FIG. 7 is a transverse vertical section as seen in the direction of arrows from the line VII—VII of FIG. 5.

FIGS. 5 and 7 illustrate another dispenser which is utilized for selectively dispensing predetermined lengths of two convoluted tapes and which is equipped with a special cutting device adapted to sever and to collect such lengths of each tape which are expelled from the housing. The housing 101 of this dispenser includes a lower portion or base 102 and an upper portion or cover 103 which is detachable from the base to afford access to the internal chamber 101b. The front portion 126 of the housing which is detachable from the base 102 extends upwardly to form an arcuate wall whose outer side is provided with indicia (not shown) in the same way as described in connection with FIG. 3. This front portion or wall 126 defines with the base 102 a horizontally extending discharge opening 101a at a level slightly above the bottom wall 104 of the base. The chamber 101b accommodates a rear shaft (not shown) for two reels 128 of tape 129, and a front shaft 108 whose ends are mounted in upwardly extending bearing brackets 106, 107 which are secured to the base 102. The bracket 107 carries at its upper end a bearing sleeve 109 with a noncircular bore to prevent rotation of the shaft 108. This shaft carries two transfer rollers 110 and two actuating levers 112. The manner in which the levers 112 cooperate with the respective rollers 110 to rotate these rollers in a clockwise direction, as viewed in FIG. 5, is the sames as described in connection with FIGS. 1 to 3. The rollers 110 are normally held against rotation with respect to the shaft 108, and the handles 112b of the levers 112 extends through slots 113 provided in the front wall 126. The tips of the releasing rods are indicated at 122. The front wall 126 is formed with pairs of arcuate ribs 127 which are adjacent to the flanges 110b of the rollers 110 and which cooperate with suitably spaced projections 125 on the respective flanges to insure that the tape is withdrawn from the chamber 101b when the respective lever 112 is pivoted in a clockwise direction, as viewed in FIG. 5. The starting positions of these levers are indicated at 131. The construction of the one-way clutch means which compel the rollers 110 to follow all clockwise angular displacements of the respective levers 112 is the same as shown in FIG. 2.

Figure 6:
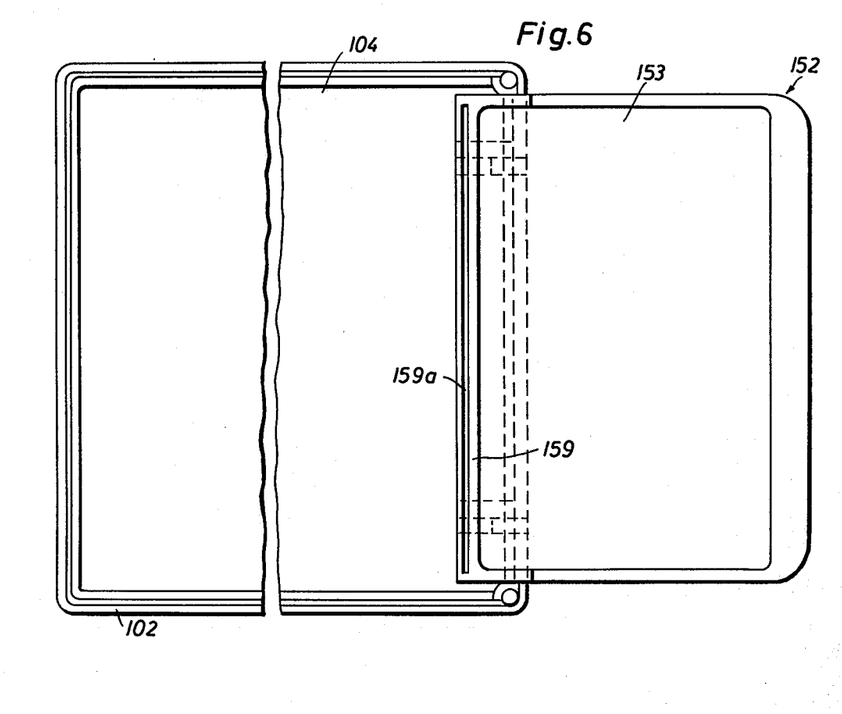
FIG. 6 is a fragmentary top plan view of the lower part of the housing which forms part of the dispenser shown in FIG. 5.
Figure 8:
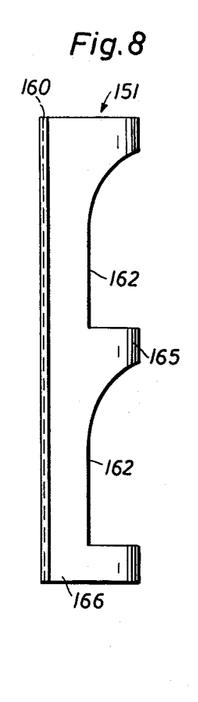
FIG. 8 is a top plan view of an elastic knife which constitutes one element of the cutting device shown in FIGS. 5 to 7.

The cutting device of the dispenser shown in FIGS. 5 and 7 comprises a first knife 150 which is fixed to the front wall 126 at a level above the discharge opening 101a and a second knife 151 which is fixed to a handgrip means 152. This handgrip means comprises a shallow receptacle or tray 153 which is outwardly adjacent to and which is located at a level below the discharge opening 101a so that it may collect the coupons which are severed when the handgrip means 152 is moved from its idle position (shown in FIG. 5) to a second position by pivoting in the direction indicated by an arrow 155. The handgrip means further includes a pair of spaced brackets 156 which are provided with horizontal pivot members 157 received in suitable bearing sleeves 158. The sleeves 158 are carried by brackets 158a which are rigid with the base 102. Thus, the receptacle 153 is free to pivot about the common axis of the pivot members 157 and extends through the discharge opening 101a. The rear wall 159 of the handgrip means 152 which is located in the chamber 101b serves as a support for the downwardly extending vertical edge portion 160 of the movable knife 151. This movable knife is shown in greater detail in FIGS. 6, 8 and 9. Its median portion defines two arcuate cutting edges 162 each of which may slide along the cutting edge 163 of the fixed knife 150 when the receptacle 153 is pivoted in a clockwise direction, as viewed in FIG. 5. The cutting edge 163 defines with the cutting edges 162 two apertures 164 each of which permits the expulsion of one tape when the receptacle assumes the position of FIG. 9. However, when the operator decides to pivot the receptacle (arrow 155) the cutting edges 164 will slide along the cutting edge 163 and will sever the tapes whereby the severed portion of each tape descends by gravity and comes to rest in the receptacle. The vertical edge portion 160 of the knife 151 is anchored in a slot 159a provided in the rear wall 159, see FIG. 6.

Figure 9:
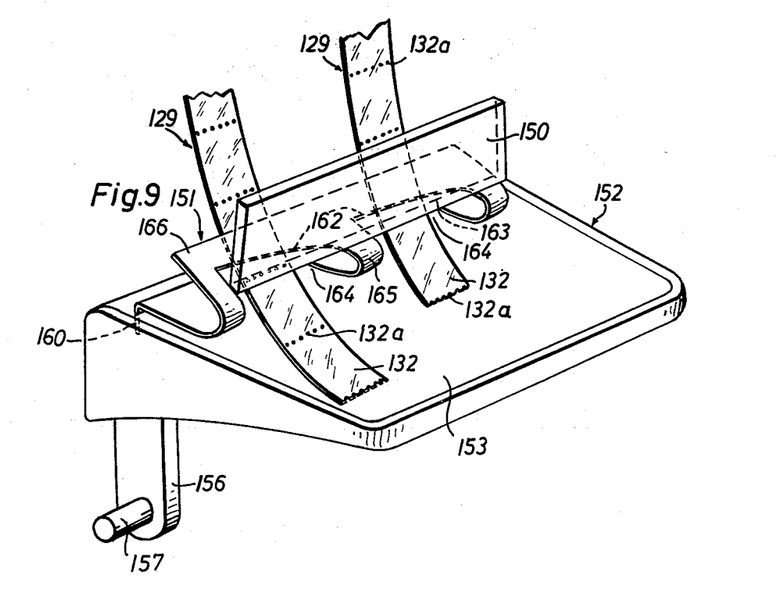
FIG. 9 is a perspective view of the cutting device which is shown in FIGS. 5 to 7.

The knife 151 consists of elastic sheet steel stock and abuts against the knife 150 so that it automatically returns the receptacle 153 to the position of FIG. 9 as soon as the latter is released by the hand of an operator. In other words, the knife 151 serves as a resilient return spring which permanently biases the handgrip means 152 in a sense to maintain the handgrip means in the idle position of FIG. 5 or 9.

The cutting edges 162 of the knife 151 are separated by a lip 165 which bears against the central portion of the knife 150. The free edge portion 166 of the knife 151 serves to guide the tapes 129 into the respective apertures 164. FIG. 9 shows that the cutting edge 163 is located at the upper sides of the tapes 129 and that the cutting edges 162 are located at the undersides of these tapes. Each tape comprises a series of coupons 132 which are separated by transversely extending rows of perforations 132a. One row of such perforations is adjacent to the cutting edge 163 when the respective actuating lever 112 assumes the starting position 131 so that the cutting edges 162, 163 will sever each tape across a row of perforations. In FIG. 9, the cutting edges 162, 163 are about to perform a shearing action so as to sever two coupons 132 from the left-hand tape 129 and to sever one coupon 132 from the right-hand tape.

It is clear that the dispenser of FIGS. 5 to 9 may be modified so as to serve for dispensing of a single tape or of three or more tapes. Also, the handgrip means 152 may be biased by a helical spring or the like and the movable knife 151 may be replaced by a knife which will sever the tapes in response to upward movement of the receptacle 153.

Figure 10:
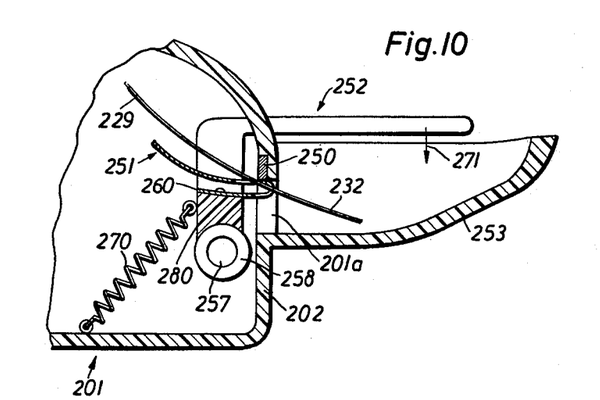
FIG. 10 is a fragmentary longitudinal vertical section through another dispenser which comprises a modified cutting device.

FIG. 10 illustrates an additional dispenser wherein the lower portion or base 202 of the housing 201 carries a pivot member 257 for the bearing sleeve 258 of a modified handgrip means which assumes the form of an angular lever 252 and which carries a knife 251 corresponding to the knife 151 of FIGS. 5 to 9. The other knife 250 is fixed to the housing 201 at a level above the discharge opening 201a. The lever 252 extends through an aperture provided in the base 202 and is permanently biased by a helical spring 270 so as to assume a position in which the knifes 250, 251 define an aperture for the tape 229. When the lever 252 is pivoted against the bias of the spring 270 (arrow 271), the cutting edge of the knife 251 will cooperate with the cutting edge of the knife 250 to sever one or more coupons 232 from the tape 229 after the non-illustrated actuating lever of the dispenser returns to its starting position. The coupon or coupons 232 drop into a shallow tray-shaped receptacle 253 which constitutes an integral component part of the base 202 and which may be made of suitable synthetic plastic material. This receptacle is located at a level below the opening 201a.

The transfer roller of the dispenser shown in FIG. 10 cooperates with the associated lever in the same way as described in connection with FIGS. 1 to 3. The lower edge portion 260 of the knife 251 is riveted to a horizontal carrier 280 one end of which is rigid with the lever 252. The other end of this carrier is pivotably secured to the base 202.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A dispenser, particularly for dispensing predetermined lengths of convoluted tape, comprising a housing defining an internal chamber arranged to accommodate a supply of tape and having a discharge opening; a cut-off knife mounted on said housing adjacent to said opening; a transfer roller provided in said chamber and having a tape-engaging peripheral portion; and actuating means for rotating said roller unidirectionally through selected angles so that said peripheral portion expels predetermined lengths of tape through said opening, said actuating means comprising lever means pivotably mounted in said chamber and extending from said housing, said lever means being pivotable with respect to said housing between a starting position and a series of operative positions each of which corresponds to the selection of a different length of tape which is to be expelled through said opening, and one-way clutch means comprising clutch elements provided on said roller and on said lever means, said clutch elements cooperating with each other to rotate the roller in a direction to expel the selected length of tape through said opening when the lever means is pivoted from one of said operative positions to said starting position whereupon the length of tape expelled through said opening may be severed by said knife.

2. A dispenser, particularly for dispensing predetermined lengths of convoluted tape, comprising a housing defining an internal chamber arranged to accommodate a supply of tape and having a discharge opening; a transfer roller provided in said chamber and having a tape-engaging peripheral portion; actuating means for rotating said roller unidirectionally through selected angles so that said peripheral portion expels predetermined lengths of tape through said opening, said actuating means comprising lever means pivotably mounted in said chamber and extending from said housing, said lever means being pivotable with respect to said housing between a starting position and a series of operative positions each of which corresponds to the selection of a different length of tape which is to be expelled through said opening, and one-way clutch means comprising clutch elements provided on said roller and on said lever means, said clutch elements cooperating with each other to rotate the roller in a direction to expel the selected length of tape through said opening when the lever means is pivoted from one of said operative positions to said starting position; and a cutting device including a first knife secured to said housing and adjacent to said opening so as to be located at one side of that length of tape which is expelled from said chamber, handgrip means articulately secured to said housing and movable between two spaced positions, and a second knife secured to said handgrip means and located at the other side of that length of tape which is expelled from said chamber, said second knife cooperating with said first knife to sever the tape when said handgrip means is moved to the other position.

3. A dispenser as set forth in claim 2, wherein said handgrip means comprises a receptacle which is outwardly adjacent to and which is located beneath said opening when the handgrip means assumes said other position so that the severed length of tape drops into said receptacle.

4. A dispenser, particularly for dispensing predetermined lengths of convoluted tape, comprising a housing defining an internal chamber arranged to accommodate a supply of tape and having a discharge opening; a transfer roller provided in said chamber and having a tape-engaging peripheral portion; actuating means for rotating said roller unidirectionally through selected angles so that said peripheral portion expels predetermined lengths of tape through said opening, said actuating means comprising lever means pivotably mounted in said chamber and extending from said housing, said lever means being pivotable with respect to said housing between a starting position and a series of operative positions each of which corresponds to the selection of a different length of tape which is to be expelled through said opening, and one-way clutch means comprising clutch elements provided on said roller and on said lever means, said clutch elements cooperating with each other to rotate the roller in a direction to expel the selected length of tape through said opening when the lever means is pivoted from one of said operative positions to said starting position; and a cutting device including a first knife secured to said housing adjacent to said opening and located at one side of that length of tape which is expelled from said chamber, and a second knife secured to said lever means and located at the other side of that length of tape which is expelled from said chamber when said lever means assumes a position other than said starting position, said knifes cooperating with each other to sever the tape when the lever means is moved toward and into said starting position.

5. A dispenser as set forth in claim 4, wherein said knifes have cutting edges which sever the tape with a shearing action when the lever means moves to said starting position.

6. A dispenser as set forth in claim 4, further comprising a receptacle outwardly adjacent to and located at a level below said opening so that the length of tape severed by said cutting device drops into said receptacle, said receptacle being secured to said housing.

7. In a dispenser, particularly for dispensing predetermined lengths of convoluted tape, in combination housing means defining an internal chamber arranged to accommodate a supply of tape and having a front wall provided with a discharge opening through which a length of tape may be expelled from said chamber; and a cutting device including a first knife secured to said housing means and having a cutting edge adjacent to and disposed at a level above said opening so as to be located at the upper side of that portion of tape which is expelled from said chamber, handgrip means articulately secured to said housing means and movable independently of the movement of the tape between two spaced positions, and a second knife secured to said handgrip means and having a cutting edge located at the underside of that portion of tape which is expelled from said chamber when said handgrip means assumes one of said positions, the cutting edge of said second knife cooperating with the cutting edge of said first knife to sever the tape when said handgrip means is moved to the other position.

8. A combination as set forth in claim 1, wherein said handgrip means comprises a receptacle into which the severed portion of the tape descends when the handgrip means assumes said other position.

9. A combination as set forth in claim 1, wherein the cutting edge of said first knife is disposed in a substantially horizontal plane, one of said means including a horizontal pivot member and the other of said means including a bearing rotatably receiving said pivot member so that said handgrip means is pivotable with respect to said housing means.

10. In a dispenser, particularly for dispensing predetermined lengths of convoluted tape, in combination, housing means defining an internal chamber arranged to accommodate a supply of tape and having a front wall provided with a discharge opening through which a length of tape may be expelled from said chamber; and a cutting device including a first knife secured to said housing means and having a cutting edge adjacent to and disposed at a level above said opening so as to be located at the upper side of that portion of tape which is expelled from said chamber, handgrip means having a first portion received in said chamber and a second portion extending through said opening, pivot means articulately securing said first portion to said housing means so that said handgrip means is pivotable independently of the movement of the tape between two spaced positions, and a second knife comprising an edge portion anchored in the first portion of said handgrip means and having a cutting edge located at the underside of that portion of tape which is expelled from said chamber when said handgrip means assumes one of said positions, the cutting edge of said second knife cooperating with the cutting edge of said first knife to sever the tape when said handgrip means is moved to the other position.

11. In a dispenser, particularly for dispensing predetermined lengths of convoluted tape, in combination, a housing defining an internal chamber arranged to accommodate a supply of tape and having a discharge opening through which a length of tape may be expelled from said chamber; and a cutting device including a first knife secured to said housing and having a cutting edge adjacent to said opening so as to be located at one side of that length of tape which is expelled through the opening, handgrip means articulately secured to said housing and movable between two spaced positions, a second knife arranged to follow movements of said handgrip means and having a cutting edge located at the other side of that portion of the tape which is expelled through said opening when said handgrip means assumes one of said positions, said second knife being arranged to abut said first knife when said handgrip means is in said one position, the cutting edge of said second knife co-operating with the cutting edge of said first knife to sever the tape when said handgrip means is moved to the other position, and resilient means integral with said second knife and arranged to return the handgrip means to said one position so that said second knife normally abuts against said first knife.

References Cited by the Examiner

UNITED STATES PATENTS

| Re. 19,756 | 11/35 | Krueger | 118—41 |
| Re. 20,955 | 12/38 | Krueger | 118—41 |
| 1,644,639 | 10/27 | Diago | 83—522 |
| 1,945,218 | 1/34 | Fishburn et al. | 83—242 |
| 2,001,903 | 5/35 | Furrer | 83—243 |
| 2,108,496 | 2/38 | Link | 226—129 |
| 2,291,668 | 8/42 | Weigolt | 83—589 |
| 2,828,124 | 3/58 | Marcuse et al. | 226—129 |
| 2,858,885 | 11/58 | Loeb | 83—242 |

ANDREW R. JUHASZ, *Primary Examiner.*

LEON PEAR, *Examiner.*